Figure 1:
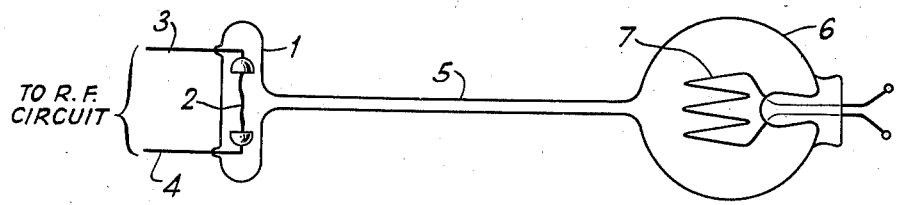

July 11, 1939.  H. PIGGE  2,165,726

MEANS FOR DETECTING AND MEASURING ULTRA SHORT WAVE OSCILLATIONS

Filed Jan. 19, 1938

INVENTOR.
HANS PIGGE
BY
ATTORNEY.

Patented July 11, 1939

2,165,726

UNITED STATES PATENT OFFICE 2,165,726

MEANS FOR DETECTING AND MEASURING ULTRA SHORT WAVE OSCILLATIONS

Hans Pigge, Berlin, Germany, assignor to Telefunken Gesellschaft für Drahtlose Telegraphie m. b. H., Berlin, Germany, a corporation of Germany Application January 19, 1938, Serial No. 185,662
In Germany January 27, 1937

6 Claims. (Cl. 250—25)

In the measurement of potential or of current, or in demodulation of ultra-short waves by known arrangements (bolometer, diode, etc.), certain difficulties arise in the attempt to preclude radio frequency energy from the direct current leads. Other difficulties arise in attempting to arrange the direct current leads in such a way that they will have as little effect as possible on the radio frequency field to be measured. Diodes and equivalent devices as heretofore used, moreover, involve the shortcoming that a symmetric energy lead is caused to carry dissymmetric load as a result of non-equivalent electrodes. For this reason, it has been found to be imperative to resort to push-pull organizations comprising special "symmetricizing" or compensator means. Systems of this last type are also unsatisfactory, inasmuch as that part of the measuring system which is fed with radio frequency energy is associated with the evaluating or indicator means through galvanic or conductive leads or connections.

The insertion of choke-coils and stopper (i. e., rejector) circuits in the leads does obviate some difficulties, to a certain extent, whenever the object is (as is true in transmitters) to prevent the leaking away of relatively large volumes of energy by way of the leads. But in receiver sytems, the small volumes of energy which are able to leak away to ground, etc., by way of the distributed capacities of the supply leads and stopper circuits, do not play any appreciable part at all because they lie inside the order of magnitude of the measuring energies. The system of the present invention insures a very effective remedy for the foregoing difficulties.

According to the invention, the means adapted to indicate the radio frequency oscillations is disposed entirely outside the radio frequency field and is connected with the measuring point by way of non-conducting connections or links with the result that reactions are minimized.

The system of the present invention is designed to detect and measure ultra-short wave oscillations and has the outstanding characteristic that a small amount of conducting or non-conducting substance or material which is confined within a gas tight vessel under a certain pressure is heated by the radio frequency energy, and that the pressure variation caused as a consequence is measured by the aid of a Pirani type manometer.

Where a current measurement is concerned, it will be preferable to enclose a filamentary conductor (bolometer conductor) in a suitable container, while conductive connection is established with the measuring point. If voltage measurements are dealt with, it will, of course, be feasible to use a filamentary conductor having a relatively high resistance. In the latter case it may be of greater advantage to use a non-conductive or dielectric material with a high phase angle difference, and to interpose the same in an electric field set up between two measuring electrodes confined within a suitable vessel.

Figure 2:
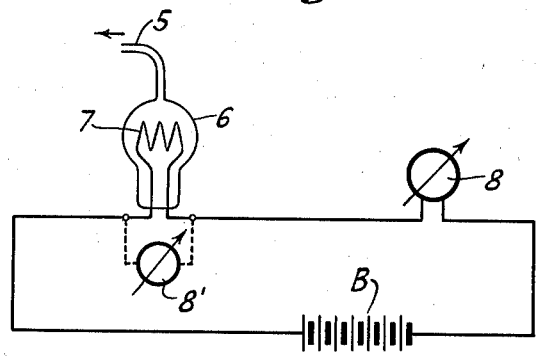
Figure 3:
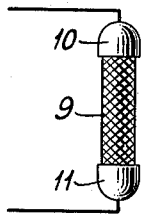

A better understanding of the invention may be had by reference to the following description which is accompanied by a drawing wherein:

Fig. 1 illustrates, by way of example only, a substantially complete measuring circuit in accordance with the invention, and Figs. 2 and 3 illustrate details of the arrangement of Fig. 1 which can be used in the complete measuring circuit.

Fig. 1 shows the fundamentals of a measuring organization in accordance with the invention. Inside a small glass bulb 1 containing a small volume of gas there is sealed an extremely tenuous Wollaston wire or bolometer conductor 2 acting as the heating wire, so that the terminal leads 3 and 4 thereof may be connected directly, for instance with a radio frequency energy line. If the resistance of the filament or heating conductor 2 is adequately high, then the watt power absorption will be so small that it will practically cause no alteration in the state of potential prevailing at the measuring point, but the resistance should be sufficiently high to produce a slight rise of temperature in the filament or conductor 2. As a result of the rise in temperature, there is caused a rise of pressure of the small volume of gas which has been sealed inside the glass bulb 1. This change in pressure is imparted through a capillary tubelet 5 to a Pirani type manometer. The change in resistance of the manometer filament 7, for instance, is measured in a bridge scheme and this, in turn, furnishes clues regarding the variation of the high frequency quantity.

One merit of this arrangement is that the direct current supply leads brought to the measuring wire of the Pirani manometer or pressure gauge are sufficiently removed from the radio frequency field so that any disturbances introduced by conduction and resonance are slight and practically negligible, in spite of high sensitiveness of the system, and there are required only slight energy amounts for measuring purposes. Moreover, the measuring point has a symmetric load. The lag in adjustment or indication (response) may be minimized provided that optimum dimensions have been chosen, that is, low thermal capacity or inertia of the filament, reduced gas volume. External heat influences may be eliminated by accommodating the instrument within a heat insulating case.

Fig. 2 shows the so-called Pirani manometer in its simplest form of construction, in accordance with the invention. Inside a glass bulb 6 is as large a filament 7 as feasible. The latter is fed from a battery B. Ordinarily a standard glow-lamp for use on about 110 volts is used, with the pump nipple extended and brought out. In series or in parallel relation to the filament 7 is an indicator instrument 8 or 8', respectively, which is designed to indicate changes in current intake of the filament and changes in the voltage across the filament. It will be evident that the measuring arrangement becomes more sensitive if the filament is made to form an arm of a bridge scheme. In the case of the Pirani measuring principle, recourse is had to the thermal conductivity of a gas and gas pressure. (For further details on the Pirani manometer or pressure gauge, reference is here made to the article in Verhandlungen der deutschen physikalischen Gesellschaft, 1906, pages 686–694.)

Fig. 3 illustrates a special embodiment of the body to be heated. It has been pointed out above that, for instance, for potential measurements it is possible to predicate the measurement upon the evolution of heat occasioned in a dielectric material by action of the radio frequency energy. A body or element 9 consisting of a non-conducting substance, or a dielectric having a high phase angle difference, is inserted between the two electrodes 10 and 11. The body 9 must be so dimensioned that the voltage gradient of the electric field, for a given alternating potential, is relatively high in order that sufficient heating may be occasioned. Caution should be exercised to avoid extremely small spacing between the supply or feed electrodes lest an undue capacitive shunt (which is a function of the frequency) be set up, and this naturally would vitiate the measuring results.

By choosing suitable forms and arrangements for the insert body (either very high or very low resistance), the device is useful for voltage and for current measurements, or as a detector.

In order to avoid glow-discharge, it is desirable to use a gas requiring a high exciting potential. Such extraneous temperature influences may be neutralized by means of a zero balance of a Wheatstone bridge as may exist if the calibration curve (which by the way may be plotted by the aid of direct current) be straight. But, if the calibration graph is not straight, then the influence of heating from the outside may be taken into consideration by the aid of an empirically determined correction table.

If desired, a vacuum vessel (such as a thermos bottle) could be employed instead of element 9 of Fig. 3, in which case there will be occasioned an appreciable time lag before the pressure gauge can indicate differences in frequencies to be measured.

What is claimed is:

1. A measuring instrument including a conductor through which the current to be measured is passed and having a resistance which is a known function of frequency, a gas filled vessel enclosing said conductor, and pressure responsive means communicating with said vessel through a tubular passage for measuring the pressure of gas in said vessel.

2. A measuring instrument including a conductor through which the current to be measured is passed and having a resistance which is a known function of frequency, a gas filled vessel enclosing said conductor, and pressure responsive means communicating with said vessel through a tubular passage for measuring the pressure of gas in said vessel, said means being located outside the electromagnetic field of said conductor.

3. An instrument in accordance with claim 1, characterized in this that said vessel has a very small gas content.

4. A measuring instrument including a conductor through which the current to be measured is passed and having a resistance which is a known function of frequency, a gas filled vessel enclosing said conductor, and pressure responsive means for measuring the pressure of gas in said vessel, said means being located outside the electromagnetic field of said conductor, said vessel having a very small gas content, said conductor being separated from said means by a fine diameter hollow tube of non-conducting material.

5. A measuring instrument including a heater wire through which the alternating current to be measured is adapted to flow, a gas filled vessel enclosing said conductor, the temperature of said wire being adapted to increase with passage of current therethrough with a consequent increase in pressure of the gas in said vessel, a pressure gauge removed from said gas filled vessel and a hollow tubular passage of non-conducting material communicating with both said vessel and said gauge, whereby rise in temperature of said wire causes a rise in pressure of said gas with a consequent indication of said change in pressure on said gauge.

6. In combination, a gas filled vessel containing a heater wire whose terminals extend from opposite ends of said vessel, a source of radio frequency energy to be measured, a pair of connections extending from said source to said terminals, and a hollow tubular passage of non-conducting material one end of which communicates with the interior of said vessel and the other end of which communicates with the interior of a pressure gauge, whereby passage of current through said heater wire causes a variation in pressure of said gas and an indication on said gauge.

HANS PIGGE.